United States Patent
Wada

(10) Patent No.: US 10,979,589 B2
(45) Date of Patent: Apr. 13, 2021

(54) CONTROL SYSTEM, MANAGEMENT APPARATUS, AND IMAGE FORMING APPARATUS THAT PERFORM CONTROL WHEN ABNORMALITY OCCURS IN IMAGE FORMING APPARATUS

(71) Applicant: KYOCERA Document Solutions Inc., Osaka (JP)

(72) Inventor: Minoru Wada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/733,709

(22) Filed: Jan. 3, 2020

(65) Prior Publication Data
US 2020/0236239 A1  Jul. 23, 2020

(30) Foreign Application Priority Data
Jan. 23, 2019 (JP) .............................. JP2019-009715

(51) Int. Cl.
*H04N 1/00* (2006.01)
*G06F 1/3206* (2019.01)

(52) U.S. Cl.
CPC ....... *H04N 1/00814* (2013.01); *G06F 1/3206* (2013.01); *H04N 1/00891* (2013.01)

(58) Field of Classification Search
CPC ............ H04N 1/00814; H04N 1/00891; G06F 1/3206; B41J 2/375; B41J 2/365; G03G 15/2039; G03G 15/2003; G03G 21/20
See application file for complete search history.

(56) References Cited

U.S. PATENT DOCUMENTS

| | | | | |
|---|---|---|---|---|
| 2003/0048317 | A1* | 3/2003 | Usui | B41J 29/393 347/14 |
| 2011/0243594 | A1* | 10/2011 | Saito | G03G 15/2039 399/70 |
| 2014/0003830 | A1* | 1/2014 | Higashi | G03G 15/205 399/69 |
| 2016/0320827 | A1* | 11/2016 | Ou Yang | G06F 1/3206 |
| 2017/0060203 | A1* | 3/2017 | Hagiwara | H04N 1/00814 |
| 2017/0153564 | A1* | 6/2017 | Kanaya | G03G 15/0266 |
| 2019/0041779 | A1* | 2/2019 | Takagi | G03G 15/2039 |
| 2019/0122759 | A1* | 4/2019 | Wakimoto | G01C 21/206 |

FOREIGN PATENT DOCUMENTS

JP  2010-062990 A  3/2010

* cited by examiner

*Primary Examiner* — Juan M Guillermety
(74) *Attorney, Agent, or Firm* — IP Business Solutions, LLC

(57) ABSTRACT

A control system includes: image forming apparatuses at least one of which is installed in each of a plurality of areas in a building; a management apparatus; and alarms that are each provided for each of the areas, respectively. The management apparatus manages security of the building including the plurality of areas, detects an abnormal high temperature occurrence area by identifying the area in which the image forming apparatus from which the abnormal high temperature is detected is installed when the abnormal high temperature is detected in the image forming apparatus, and transmits a report command notification for reporting that the abnormal high temperature has occurred in the area in which an alarm is provided to the alarm which is provided in the abnormal high temperature occurrence area.

9 Claims, 11 Drawing Sheets

Fig.5

| | USER ID OF QUALIFIED USER | | | | | | |
|---|---|---|---|---|---|---|---|
| ENTRY TO BUILDING | A001 | A002 | A003 | A004 | A007 | A008 | A009 |
| ENTRY TO AREA E1 | A001 | A002 | A003 | A004 | A007 | A008 | A009 |
| ENTRY TO AREA E2 | A002 | A003 | A004 | A007 | A008 | A009 | A010 |
| ENTRY TO AREA E3 | A003 | A004 | A008 | A009 | A010 | A011 | A013 |
| ENTRY TO AREA E4 | A008 | A020 | A021 | A040 | A042 | A061 | A077 |
| ENTRY TO AREA E5 | A040 | A081 | A163 | A194 | A201 | | |

| APPARATUS ID | AREA NUMBER |
|---|---|
| M1234561 (IMAGE FORMING APPARATUS 6A) | E1 |
| M1234562 (IMAGE FORMING APPARATUS 6B) | E2 |
| M1234563 (IMAGE FORMING APPARATUS 6C) | E2 |
| M1234564 (IMAGE FORMING APPARATUS 6D) | E3 |
| M1234565 (IMAGE FORMING APPARATUS 6E) | E3 |

| ALARM ID | AREA NUMBER |
|---|---|
| A0001 (ALARM A1) | E1 |
| A0002 (ALARM A2) | E2 |
| A0003 (ALARM A3) | E3 |
| A0004 (ALARM A4) | E4 |
| A0005 (ALARM A5) | E5 |

| REFERENCE AREA | CLOSEST AREA | | |
|---|---|---|---|
| | 1 | 2 | 3 |
| E1 | E2 | E5 | — |
| E2 | E1 | E3 | E5 |
| E3 | E2 | E4 | — |
| E4 | E3 | — | — |
| E5 | E1 | E2 | — |

CONTROL SYSTEM, MANAGEMENT APPARATUS, AND IMAGE FORMING APPARATUS THAT PERFORM CONTROL WHEN ABNORMALITY OCCURS IN IMAGE FORMING APPARATUS

INCORPORATION BY REFERENCE

This application claims priority to Japanese Patent Application No. 2019-009715 filed on Jan. 23, 2019, the entire contents of which are incorporated by reference herein.

BACKGROUND

The present disclosure relates to a control system, a management apparatus, and an image forming apparatus and more particularly to control when an abnormality occurs in an image forming apparatus.

A technique for detecting an abnormality which occurs near an image forming apparatus and preventing a secondary accident has been proposed. For example, as a general technique, an image forming apparatus that has an abnormality detecting function, transmits abnormality information to the outside at the time of occurrence of an abnormality and switches a power supply of the apparatus to a secondary battery or turns off the power supply is known.

An image forming apparatus is provided with a fixing temperature sensor that detects a temperature of a fixing device. An image forming apparatus may be provided with an internal temperature sensor that detects an internal temperature or an external temperature sensor that detects an external temperature.

SUMMARY

The inventor found that an abnormal high temperature which occurs in an image forming apparatus can be detected without providing a new temperature sensor in the image forming apparatus by employing temperature sensors which are provided in the image forming apparatus, and completed the present disclosure.

An aspect of the present disclosure proposes a technique with further improvement of the above-mentioned technique.

A control system according to an aspect of the present disclosure includes image forming apparatuses at least one of which is installed in each of a plurality of areas in a building, a management apparatus that manages security of the building, and alarms that are each provided for each of the areas, respectively. Each of the image forming apparatuses includes a temperature sensor, a first communication device, a first processor, and a first storage device. The first communication device communicates with an external device. The first storage device stores a first control program. The first processor functions as, by executing the first control program, an abnormal high temperature detector and a first controller. The abnormal high temperature detector detects whether a temperature detected by the temperature sensor is equal to or higher than a threshold value which is predetermined as an abnormal high temperature. The first controller causes the first communication device to transmit abnormal high temperature information indicating that an abnormal high temperature has occurred in the image forming apparatus to the management apparatus when the abnormal high temperature detector detects that the temperature is equal to or higher than a threshold value. The management apparatus includes a second storage device, a second communication device, and a second processor. The second storage device includes an installation area information storage device storing installation area information indicating the areas in which the image forming apparatuses are installed. The second communication device communicates with an external device. The second processor functions as, by executing a second control program which is stored in the second storage device, an area detector and a second controller. The area detector detects an area in which the image forming apparatus having transmitted the abnormal high temperature information is installed as an abnormal high temperature occurrence area on the basis of the installation area information when the second communication device receives the abnormal high temperature information. The second controller causes the second communication device to transmit a report command notification for reporting that an abnormal high temperature has occurred in the area in which the alarm is provided to the alarm which is provided in the abnormal high temperature occurrence area detected by the area detector.

A management apparatus according to an aspect of the present disclosure is a management apparatus that is connected to image forming apparatuses which are installed in a plurality of areas in a building and alarms that are each provided for each of the areas, respectively, and manages security of the building. The management apparatus includes a storage device, a communication device, and a processor. The storage device includes an installation area information storage device. The installation area information storage device stores installation area information indicating the areas in which the image forming apparatuses are installed. The communication device communicates with an external device. The processor functions as, by executing a control program which is stored in the storage device, an area detector and a controller. The area detector detects an area in which the image forming apparatus from which an abnormal high temperature is detected is installed as an abnormal high temperature occurrence area on the basis of abnormal high temperature information which is transmitted from the image forming apparatus and which indicates that an abnormal high temperature has occurred in the image forming apparatus and the installation area information. The controller causes the communication device to transmit a first report command notification for reporting that an abnormal high temperature has occurred in the area in which an alarm which is provided in the abnormal high temperature occurrence area detected by the area detector is provided to the alarm.

An image forming apparatus according to an aspect of present disclosure is an image forming apparatus that is connected to a management apparatus managing security of a building and is provided in the building. The image forming apparatus includes a temperature sensor, a communication device, a storage device, and a processor. The communication device communicates with an external device. The storage device stores a control program. The processor functions as, by executing the control program, an abnormal high temperature detector and a controller. The abnormal high temperature detector detects whether a temperature detected by the temperature sensor is equal to or higher than a threshold value which is predetermined as an abnormal high temperature. The controller causes the communication device to transmit abnormal high temperature information indicating that an abnormal high temperature has occurred in the image forming apparatus to the management apparatus when the abnormal high temperature detector detects that the temperature is equal to or higher than the threshold value.

BRIEF DESCRIPTION OF THE DRAWINGS

FIG. 5 is a diagram illustrating an example of a data structure which is stored in an authentication data storage device;

FIG. 7A is a diagram illustrating an example of a data structure which is stored in an installation area information storage device;

FIG. 7B is a diagram illustrating an example of a data structure which is stored in an alarm installation area information storage device;

FIG. 8 is a diagram illustrating an example of area relationship information;

DETAILED DESCRIPTION

Figure 1:
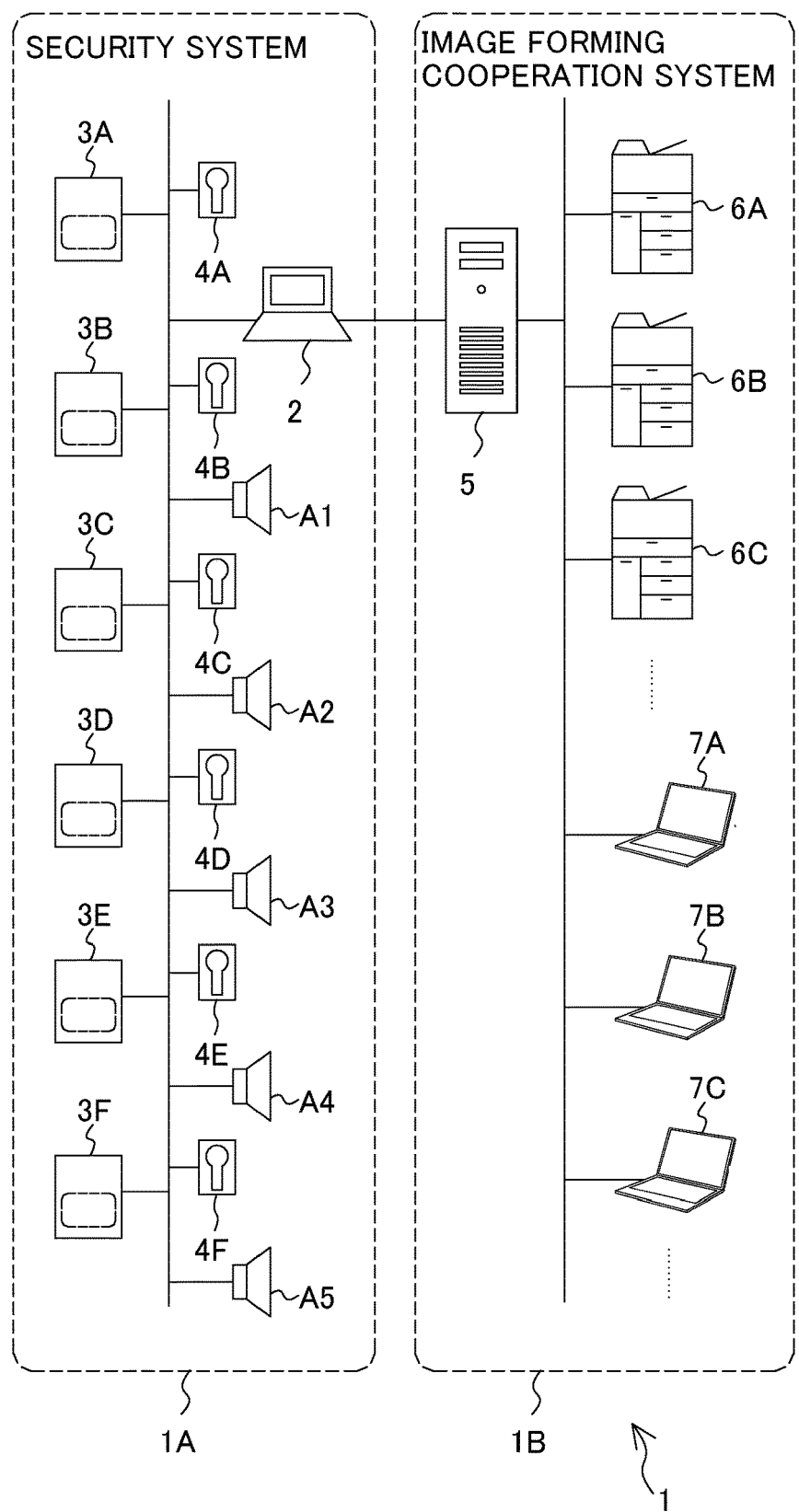
FIG. 1 is a diagram illustrating an entire configuration of a control system according to an embodiment of the present disclosure.
Figure 2:
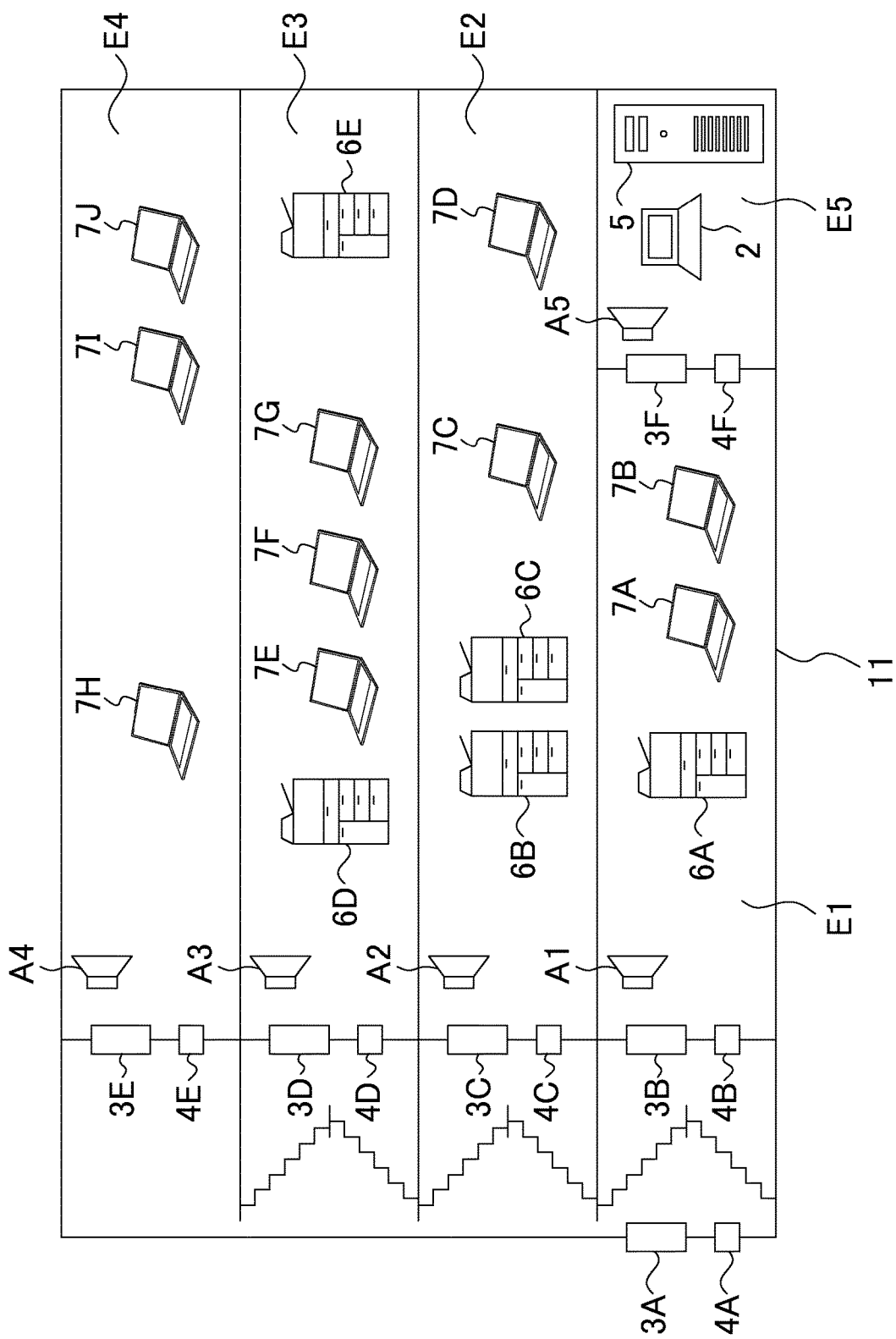
FIG. 2 is a schematic side view of a building illustrating an arrangement of devices constituting the control system.

Hereinafter, a control system, a management apparatus, and an image forming apparatus according to an embodiment of the present disclosure will be described with reference to the accompanying drawings. FIG. 1 is a diagram illustrating the entire configuration of a control system according to an embodiment. FIG. 2 is a schematic side view of a building illustrating an arrangement of devices constituting the control system.

The control system 1 includes a management apparatus 2, card readers 3A to 3F (hereinafter also referred to as "card readers 3"), electric locks 4A to 4F (hereinafter also referred to as "electric locks 4"), alarms A1 to A5 (hereinafter also referred to as "alarms A"), a server 5, image forming apparatuses 6A to 6E (hereinafter also referred to as "image forming apparatuses 6"), and terminal devices 7A to 7J (hereinafter also referred to as "terminal devices 7").

The image forming apparatus 6A and the terminal devices 7A and 7B are installed in an area E1 of the first floor of a building 11, the image forming apparatuses 6B and 6C and the terminal devices 7C and 7D are installed in an area E2 of the second floor, the image forming apparatuses 6D and 6E and the terminal devices 7E to 7G are installed in an area E3 of the third floor, and the terminal devices 7H to 7J are installed in an area E4 of the fourth floor. The management apparatus 2 and the server 5 are installed in an area E5 of the first floor indicating a management office.

The management apparatus 2, the card readers 3, the electric locks 4, and the alarms A are connected to each other via a network such as a local area network (LAN), and a security system 1A is constituted by the management apparatus 2, the card readers 3, the electric locks 4, and the alarms A. For example, a personal computer (PC) can be used as the management apparatus 2.

The card reader 3A is provided in a doorway of the building 11 and detects entry and exit of a person to and from the building 11. The card readers 3B to 3F are provided in corresponding doorways of the areas E1 to E5 in the building 11 and detect entry and exit of a person to and from the areas E1 to E5, respectively. The electric lock 4A is provided in a door of the doorway of the building 11, and the electric locks 4B to 4F are provided in doors of the corresponding doorways of the areas E1 to E5, respectively.

A user unlocks an electric lock 4 by holding up a noncontact IC card (not illustrated) carried by the user to a card reader 3. For example, when a user holds up an IC card to a card reader 3, the card reader 3 reads a user ID (for example, an employee number) which is stored in the IC card and transmits the read user ID to the management apparatus 2. A card reader 3 detects entry and exit of a user to and from an area and is an example of an entry and exit detecting device in the claims.

The management apparatus 2 manages security of the building 11, performs an authentication process on the basis of a received user ID, and unlocks the electric lock 4 of a door of the corresponding doorway when it is determined that entry to the building 11 or entry to each of the areas E1 to E5 is permitted. These processes will be described later in detail.

The server 5, the image forming apparatuses 6, and the terminal devices 7 are connected to each other via a network such as a LAN and the server 5, the image forming apparatuses 6, and the terminal devices 7 can exchange information therebetween. An image forming cooperation system 1B is constituted by the server 5, the image forming apparatuses 6, and the terminal devices 7. Examples of an image forming apparatus 6 include a multifunction machine having a plurality of functions such as a copy function, a printer function, a scan function, and a facsimile function, and an example of a terminal device 7 is a PC.

The server 5 serves to relay an operation instruction from the terminal devices 7 to the image forming apparatuses 6, receives apparatus state information indicating states (for example, power supply states or work details) of the image forming apparatuses 6, which is transmitted from the image forming apparatuses 6, monitors the states of the image forming apparatuses 6, and manages the image forming apparatuses 6.

The management apparatus 2 is connected to the server 5, can exchange information with the server 5, and exchanges information with the image forming apparatuses 6 via the server 5. For example, the management apparatus 2 receives the apparatus state information which is transmitted from the image forming apparatuses 6, monitors the states of the image forming apparatuses 6, and manages the image forming apparatuses 6 similarly to the server 5. The management apparatus 2 transmits a power-off command notification for turning off a power supply of each image forming apparatus 6 to the image forming apparatus 6 via the server 5.

When the power-off command notification which is transmitted from the management apparatus 2 via the server 5 is received, each image forming apparatus 6 turns off the power supply of the image forming apparatus 6 in accordance with the received power-off command notification.

Figure 3:
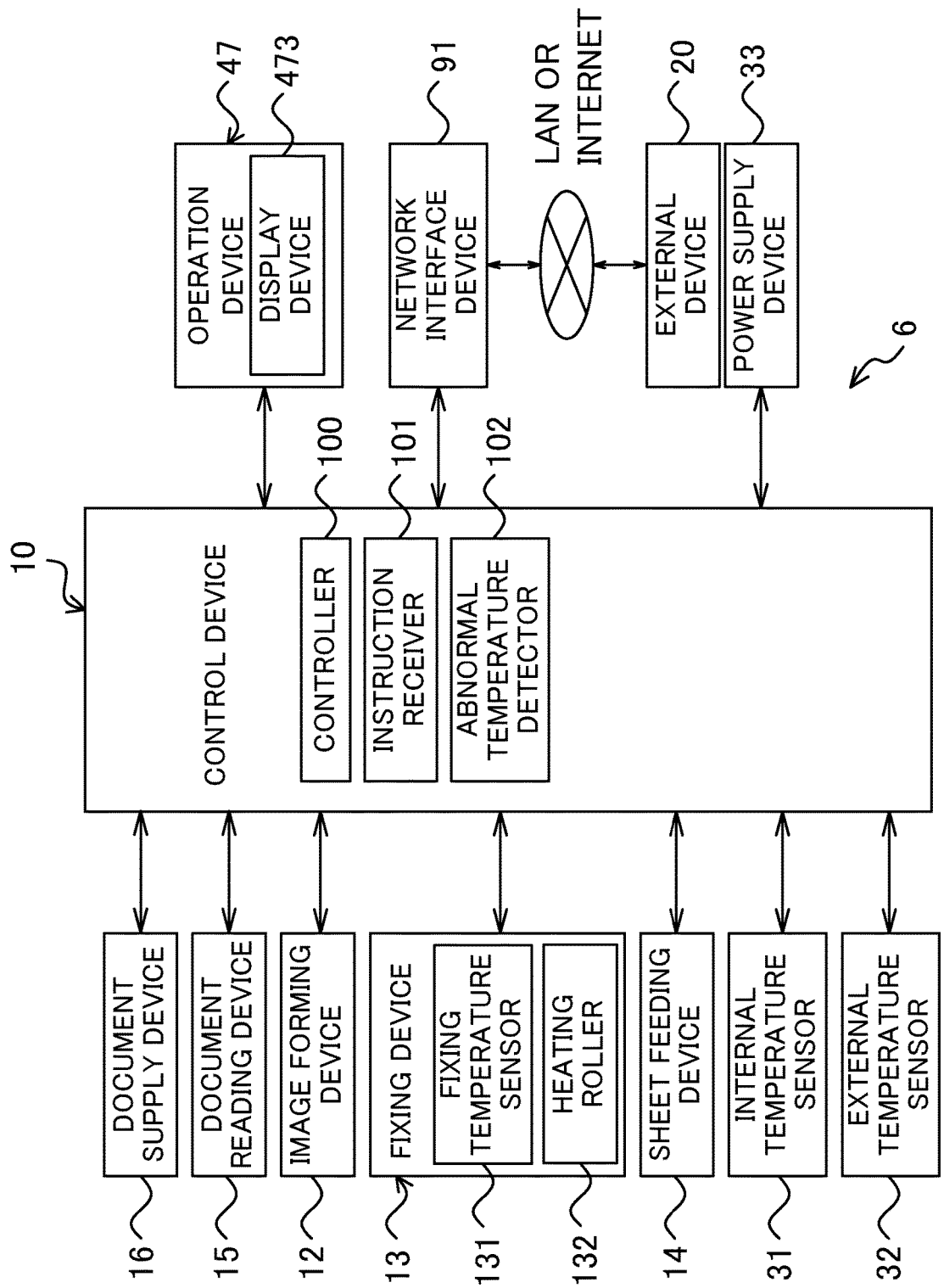
FIG. 3 is a schematic functional block diagram illustrating a principal internal configuration of an image forming apparatus constituting the control system.

FIG. 3 is a schematic functional block diagram illustrating a principal internal configuration of an image forming apparatus 6 constituting the control system 1. The image forming apparatus 6 includes a control device 10, a document supply device 16, a document reading device 15, an image forming device 12, a fixing device 13, a sheet feeding device 14, an internal temperature sensor 31, an external temperature sensor 32, an operation device 47, a network interface device 91, and a power supply device 33.

An example in which the image forming apparatus 6 performs a document reading operation will be described below. The document reading device 15 optically reads an image of a document which is conveyed by the document supply device 16 or a document which is placed on a contact glass which is not illustrated, and generates image data. The image data which is generated by the document reading device 15 is stored in an image memory or the like which is not illustrated.

An example in which the image forming apparatus 6 performs an image forming operation will be described below. The image forming device 12 forms a toner image on a recording sheet which is a recording medium which is fed from the sheet feeding device 14 on the basis of the image data which is generated through the document reading operation or image data which is received from a computer (for example, the server 5) which is an external device 20 connected to the network. The sheet feeding device 14 includes a sheet feed cassette.

The fixing device 13 includes a heating roller 132 and serves to fix the toner image onto the recording sheet by heating and pressurizing the recording sheet on which the toner image is formed by the image forming device 12 using the heating roller 132, and the recording sheet subjected to the fixing process is discharged to a sheet discharge tray which is not illustrated. The fixing device 13 includes a fixing temperature sensor 131. The fixing temperature sensor 131 detects a surface temperature of the heating roller 132 of the fixing device 13 illustrated in FIG. 3. The fixing temperature sensor 131 is an example of a temperature sensor in the claims.

The internal temperature sensor 31 detects an internal temperature of the image forming apparatus 6, and the external temperature sensor 32 detects an external temperature (a temperature around the body) of the image forming apparatus 6. The internal temperature or the external temperature is used for various types of control in formation of an image or the like. For example, a target fixing temperature is adjusted on the basis of the internal temperature and a target surface potential of a photosensitive drum of the image forming device 12 which is not illustrated is adjusted on the basis of the external temperature. The internal temperature sensor 31 and the external temperature sensor 32 are examples of a temperature sensor in the claims.

The operation device 47 includes operation buttons which are provided in the body of the image forming apparatus 6. The operation device 47 receives an instruction such as an image forming operation performing instruction for various operations and processes which can be performed by the image forming apparatus 6 in response to an operator's operation of the operation buttons. The operation device 47 outputs the received instruction to a controller 10. The operation device 47 includes a display device 473 that displays guidance for operation or the like for the controller 10.

The display device 473 includes an LCD and has a touch panel function. When an operator touches a button which is displayed on the screen of the display device 473, an instruction corresponding to the button is received by the operation device 47 using the touch panel function.

The network interface device 91 is a communication interface mechanism that transmits and receives various types of data to and from an external device 20 such as the terminal device 7 or the server 5 in a local area or over the Internet. The network interface device 91 is an example of a first communication device in the claims.

The power supply device 33 includes a power supply circuit that controls electric power which is supplied to the constituents of the image forming apparatus 6 for the purpose of operating the image forming apparatus 6. The power supply device 33 supplies electric power to the constituents of the image forming apparatus 6 or stops the supply of electric power in accordance with an instruction from the controller 100. When the power supply device 33 stops supply of electric power to the constituents of the image forming apparatus 6, the power supply of the image forming apparatus 6 is turned off.

The control device 10 includes a processor, a random access memory (RAM), a read only memory (ROM), and a dedicated hardware circuit. Examples of the processor include a central processing unit (CPU), an application specific integrated circuit (ASIC), and a micro processing unit (MPU). The control device 10 includes a controller 100, an instruction receiver 101, and an abnormal high temperature detector 102. The RAM and the ROM are examples of a storage device or a first storage device in the claims.

The control device 10 functions as the controller 100, the instruction receiver 101, and the abnormal high temperature detector 102 by causing the processor to operate in accordance with a first control program which is stored in a hard disk drive (HDD) which is not illustrated. Here, the controller 100 and the like may be constituted by hardware circuits without causing the control device 10 to operate in accordance with the first control program. The same is true of the following embodiments unless mentioned otherwise.

The controller 100 takes charge of control of the whole of operations of the image forming apparatus 6. The controller 100 is connected to the document supply device 16, the document reading device 15, the image forming device 12, the fixing device 13, the sheet feeding device 14, the internal temperature sensor 31, the external temperature sensor 32, the operation device 47, the network interface device 91, and the power supply device 33. The controller 100 performs drive control of these constituents. The controller 100 is an example of a first controller in the claims.

The controller 100 transmits apparatus state information indicating the state of the image forming apparatus 6 to the server 5 via the network interface device 91. The apparatus state indicated by the apparatus state information includes information indicating that a printer, a copier, a scanner, or a facsimile function is used, information indicating that work using a USB memory is performed, information indicating that a power supply is turned on, and information indicating that a power supply is turned off.

When a command notification which is transmitted from the management apparatus 2 via the server 5 is received by the network interface device 91, the controller 100 controls the image forming apparatus 6 on the basis of the received command notification.

The instruction receiver 101 receives an instruction which is output from the operation device 47. For example, the instruction receiver 101 receives a user's operation of a hard key of the operation device 47, and receives a user's operation of an operation screen which is displayed on the display device 473 using the touch panel function of the display device 473. The controller 100 controls the operation of the image forming apparatus 6 in response to the user's operation received by the instruction receiver 101.

The abnormal high temperature detector 102 determines whether the temperatures detected by the fixing temperature sensor 131, the internal temperature sensor 31, and the external temperature sensor 32 are equal to or higher than a threshold value indicating a predetermined abnormal temperature (a predetermined temperature indicating a high temperature which does not occur in a normal state of use). When the detected temperatures are equal to or higher than the threshold value indicating the abnormal temperature, the abnormal high temperature detector 102 determines that an abnormal high temperature has occurred in the image forming apparatus 6 and detects the abnormal high temperature of the image forming apparatus 6.

Since a temperature of about 100° C. to 200° C. is generally detected by the fixing temperature sensor 131, the abnormal high temperature detector 102 determines that an abnormal high temperature has occurred when the temperature detected by the fixing temperature sensor 131 is equal to or higher than a threshold value (an abnormal temperature) T1 (for example, 250° C.).

When the temperature which is generally detected by the internal temperature sensor 31 varies depending on an installation position in the apparatus but is, for example, equal to or lower than 80° C. and the temperature detected by the internal temperature sensor 31 becomes equal to or higher than a threshold value (an abnormal temperature) T2 (for example, 100° C.), the abnormal high temperature detector 102 determines that an abnormal high temperature has occurred. When the temperature which is generally detected by the external temperature sensor 32 varies depending on an installation position of the apparatus but is, for example, equal to or lower than 40° C. and the temperature detected by the external temperature sensor 32 becomes equal to or higher than a threshold value (an abnormal temperature) T3 (for example, 50° C.), the abnormal high temperature detector 102 determines that an abnormal high temperature has occurred. The threshold value T1, the threshold value T2, and the threshold value T3 are respectively examples of a third threshold value, a second threshold value, and a first threshold value in the claims.

When an abnormal high temperature is detected by the abnormal high temperature detector 102, the controller 100 adds abnormal high temperature information indicating that an abnormal high temperature has occurred in the image forming apparatus 6 to an apparatus ID specific to the image forming apparatus 6, transmits the apparatus ID from the network interface device 91 to the management apparatus 2 via the server 5, and controls the power supply device 33 such that the power supply of the image forming apparatus 6 is turned off.

Since the abnormal high temperature information indicating that an abnormal high temperature has occurred is transmitted from the image forming apparatus 6 to the management apparatus 2 as described above, a manager of the building 11 (for example, a doorkeeper) can rapidly ascertain that the abnormal high temperature has occurred and rapidly take measures for the abnormality.

When the abnormal high temperature detector 102 detects an abnormal high temperature outside the image forming apparatus 6, the controller 100 transmits external temperature abnormality information indicating that an abnormal temperature has occurred outside the apparatus along with the abnormal high temperature information from the network interface device 91 to the management apparatus 2 via the server 5. Accordingly, it is possible to appropriately cope with the case in which the external temperature is an abnormal high temperature.

Figure 4:
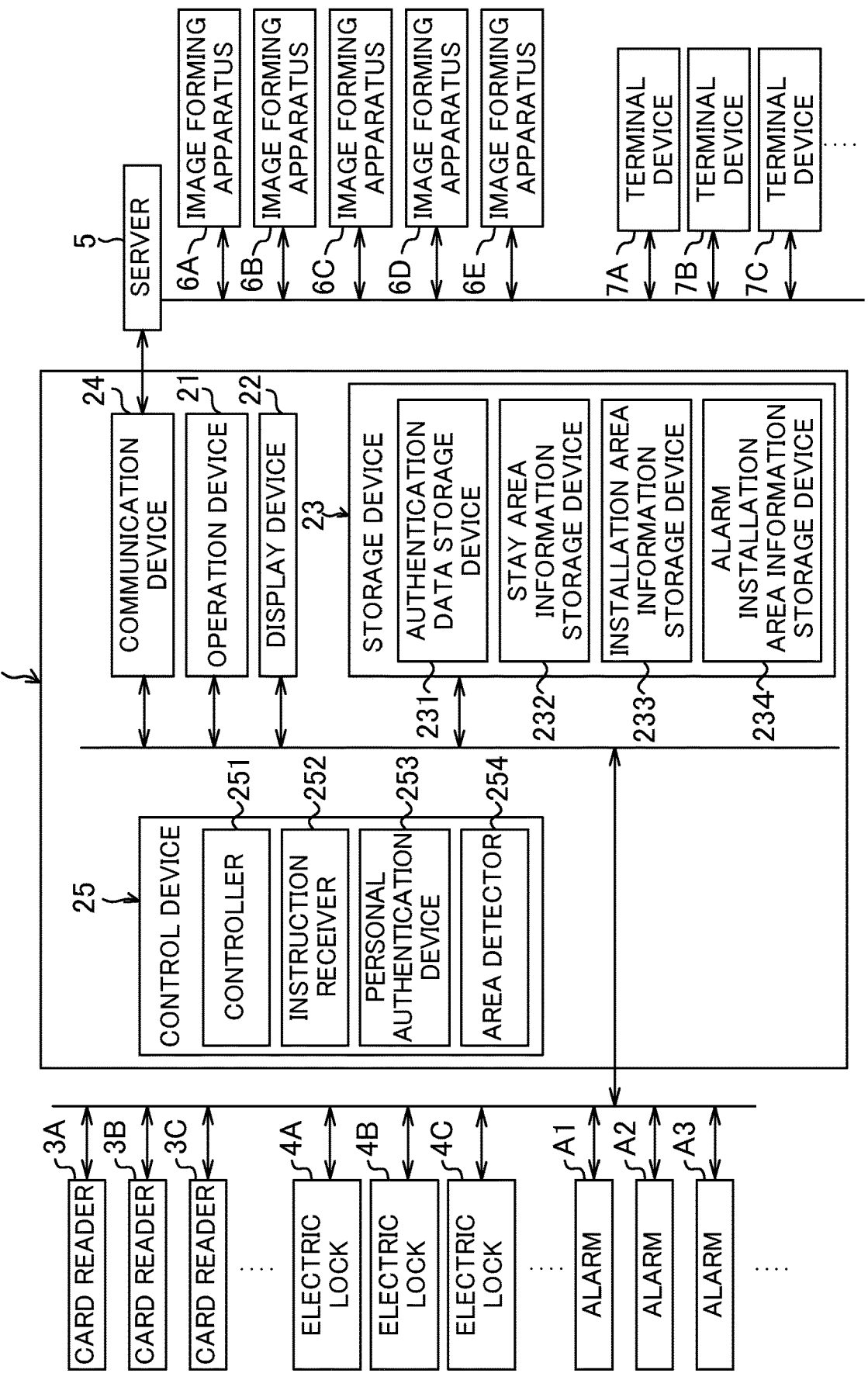
FIG. 4 is a schematic functional block diagram illustrating a principal internal configuration of a management apparatus constituting the control system.

FIG. 4 is a schematic functional block diagram illustrating a principal internal configuration of the management apparatus 2 constituting the control system 1. The management apparatus 2 includes an operation device 21, a display device 22, a storage device 23, a communication device 24, and a control device 25. These constituents can transmit and receive data or signal to and from each other via a communication path.

The operation device 21 includes a keyboard and a mouse, inputs a command or characters to the control device 25 in response to a user's operation thereof, and operates a pointer on the screen of the display device 22. The display device 22 includes an LCD and displays a response and a data result from the control device 25.

The storage device 23 is a storage device such as an HDD, stores programs or data required for the operation of the management apparatus 2, and includes an authentication data storage device 231, a stay area information storage device 232, an installation area information storage device 233, and an alarm installation area information storage device 234. The storage device 23 is an example of a storage device or a second storage device in the claims.

The authentication data storage device 231 stores authentication data which is used to determine whether a person who desires to enter the building 11 is qualified and authentication data which is used to determine whether a person who desires to enter each of the areas E1 to E5 in the building 11 is qualified.

FIG. 5 is a diagram illustrating an example of a data structure which is stored in the authentication data storage device 231. As illustrated in FIG. 5, the authentication data storage device 231 stores a user ID which is given to a user who is qualified for entry to the building 11 in correlation with an item of "entry to the building" and stores a user ID which is given to a user who is qualified for entry to each of the areas E1 to E5 in correlation with an item of "entry" to each area.

The stay area information storage device 232 stores stay area information indicating a stay area of the user to whom the user ID is given in correlation with the user ID.

Figure 6:
FIG. 6 is a diagram illustrating an example of a data structure which is stored in a stay area information storage device.

FIG. 6 is a diagram illustrating an example of a data structure which is stored in the stay area information storage device 232. As illustrated in FIG. 6, the stay area information storage device 232 stores stay area information including entry data and stay area data in correlation with the user ID. When the user enters the building 11, the entry data is set to "1." When the user does not enter the building 11, the entry data is set to "0." The area number in which the user stays is stored in the stay area data. For example, details stored in the stay area information storage device 232 represents that a user to whom a user ID "A001" is given stays in the area E1.

The installation area information storage device 233 stores installation area information indicating the areas in which the image forming apparatuses 6A to 6E are installed in the building 11.

FIG. 7A is a diagram illustrating an example of a data structure which is stored in the installation area information storage device 233. As illustrated in FIG. 7A, the installation area information storage device 233 stores the area numbers in which the corresponding apparatuses are installed in correlation with predetermined apparatus IDs "M1234561" to "M1234565" specific to the image forming apparatuses 6A to 6E. For example, details stored in the installation area information storage device 233 represent that the image forming apparatus 6A with the apparatus ID "M1234561" is installed in the area E1.

The alarm installation area information storage device 234 stores alarm installation area information indicating installation areas of the alarms which are installed in the building.

FIG. 7B is a diagram illustrating an example of a data structure which is stored in the alarm installation area information storage device 234. As illustrated in FIG. 7B, the alarm installation area information storage device 234 stores area numbers in which the corresponding alarms are installed in correlation with predetermined alarm IDs "A0001" to "A0005" specific to the alarms A1 to A5. For example, details stored in the alarm installation area information storage device 234 represent that the alarm A3 with the alarm ID "A0003" is installed in the area E3.

The communication device 24 is a communication interface including a communication module such as an LAN chip which is not illustrated and communicates with an external device. The management apparatus 2 is connected to the server 5 via the communication device 24, transmits and receives data to and from the server 5, and transmits and receives data to and from the image forming apparatuses 6 via the server 5. The communication device 24 is an example of a second communication device in the claims.

The control device 25 includes a processor, a RAM, a ROM, and a dedicated hardware circuit. Examples of the processor include a CPU, an ASIC, and an MPU. The control device 25 includes a controller 251, an instruction receiver 252, a personal authenticator 253, and an area detector 254.

By causing the processor to operate in accordance with a second control program stored in the storage device 23, the control device 25 functions as the controller 251, the instruction receiver 252, the personal authenticator 253, and the area detector 254. The constituents of the control device 25 may be constituted by hardware circuits instead of the operation of the control device 25 based on the second control program. The same is true in the following embodiments unless mentioned otherwise.

The controller 251 controls the whole of operations of the management apparatus 2. The controller 251 is connected to the operation device 21, the display device 22, the storage device 23, and the communication device 24, and performs control of operation of the constituents connected thereto or transmission and reception of signals or data to and from the constituents. The controller 251 is an example of a second controller in the claims.

The instruction receiver 252 receives an operation input from a user using the operation device 21.

When a user ID which is transmitted from one card reader 3 is received, the personal authenticator 253 searches the user IDs stored in the authentication data storage device 231 and determines whether entry to the building 11 or entry to each of the areas E1 to E5 is permitted.

When the personal authenticator 253 determines that entry to the building or entry to one area is permitted, the controller 251 receives a result of determination from the personal authenticator 253 via the communication device 24 and transmits an unlocking notification to the corresponding electric lock 4. When the electric lock 4 receives the unlocking notification from the management apparatus 2, the electric lock 4 is unlocked. Thereafter, the controller 251 updates the stay area information correlated with the user ID, which is stored in the stay area information storage device 232.

When the communication device 24 receives abnormal high temperature information which is transmitted from one image forming apparatus 6, the area detector 254 detects an abnormal high temperature occurrence area by identifying an area in which the image forming apparatus 6 of which the abnormal high temperature has been detected is installed on the basis of the installation area information stored in the installation area information storage device 233 and the apparatus ID added to the abnormal high temperature information.

The controller 251 displays occurrence information of the abnormal high temperature (for example, information indicating that the abnormal high temperature has occurred in the image forming apparatus 6 or the area in which the abnormal high temperature has occurred) on the display device 22 and transmits a first report command notification for reporting that the abnormal high temperature has occurred in the area in which the alarm A is installed from the communication device 24 to the alarm A which is provided in the abnormal high temperature occurrence area detected by the area detector 254. When the first report command notification is received, the alarm A reports, for example, a message of "a copier installed in this area has a high temperature."

For example, when the communication device 24 receives abnormal high temperature information which is transmitted from the image forming apparatus 6D to which the apparatus ID "M1234564" given thereto, the area detector 254 detects the area E3 as an abnormal high temperature occurrence area by identifying the area E3 as the area in which the image forming apparatus 6D is installed.

The controller 251 transmits the first report command notification to the alarm A3 which is provided in the area E3 which is the abnormal high temperature occurrence area. The controller 251 determines an alarm which is provided in the abnormal high temperature occurrence area on the basis of data stored in the alarm installation area information storage device 234. When the first report command notification is received, the alarm A3 reports the above-mentioned message. Accordingly, it is possible to notify a person in the area E3 which is the abnormal high temperature occurrence area that the abnormal high temperature has occurred in the image forming apparatus 6.

However, a person does not stay always in an abnormal high temperature occurrence area. For example, in the nighttime, there is a low possibility that a person stays. In this case, initial countermeasures may be delayed.

Therefore, the controller 251 calculates the number of persons who stay in the abnormal high temperature occurrence area detected by the area detector 254 on the basis of the stay area information (that is, detection information from the card reader 3) which is stored in the stay area information storage device 232 (FIG. 6), determines whether there is a person in the abnormal high temperature occurrence area, and transmits a second report command notification for reporting that the abnormal high temperature has occurred in an area near the area in which the alarm A is provided from the communication device 24 to the alarm A which is provided in the area near the abnormal high temperature occurrence area when it is determined that there is no person in the abnormal high temperature occurrence area.

For example, when there is no person in the area E3 which is the abnormal high temperature occurrence area, the second report command notification is transmitted to the alarms A2 and A4 which are provided in the areas E2 and E4, respectively, near the area E3. In order to determine the nearby areas, for example, area relationship information which is illustrated in FIG. 8 and which is stored in the storage device 23 can be used.

When external temperature abnormality information along with the abnormal high temperature information is received by the communication device 24, the controller 251 transmits a power-off command notification for turning off the power supply of the image forming apparatus 6 which is provided in the abnormal high temperature occurrence area detected by the area detector 254 from the communication device 24 to the image forming apparatus 6. That is, when the external temperature abnormality information is received, the power supply of the image forming apparatus 6 which is provided in the abnormal high temperature occurrence area is turned off. Accordingly, it is possible to reduce a possibility that a new secondary accident will occur.

In general, an earthquake, a fire, a gas leakage, and intrusion of a suspicious person are assumed as an abnormality, but when it is intended to cope with all of such accidents, it is necessary to mount a plurality of types of sensors in an image forming apparatus and thus costs for the apparatus increase.

In the related art described in the BACKGROUND, when an abnormality has occurred, the same operation is performed regardless of the type of the abnormality. However, when the operation of an image forming apparatus is changed depending on a type of an abnormality, it is considered that it is possible to more effectively prevent occurrence of a secondary accident.

On the other hand, in this embodiment, it is possible to appropriately prevent a secondary accident when an abnormal high temperature has occurred in an image forming apparatus with a relatively simple configuration.

Since the image forming apparatus 6 in which an abnormal high temperature has been detected turns off a power supply thereof after transmitting abnormal high temperature information to the management apparatus 2, the controller 251 may not transmit the power-off command notification to the image forming apparatus 6.

Figure 9:
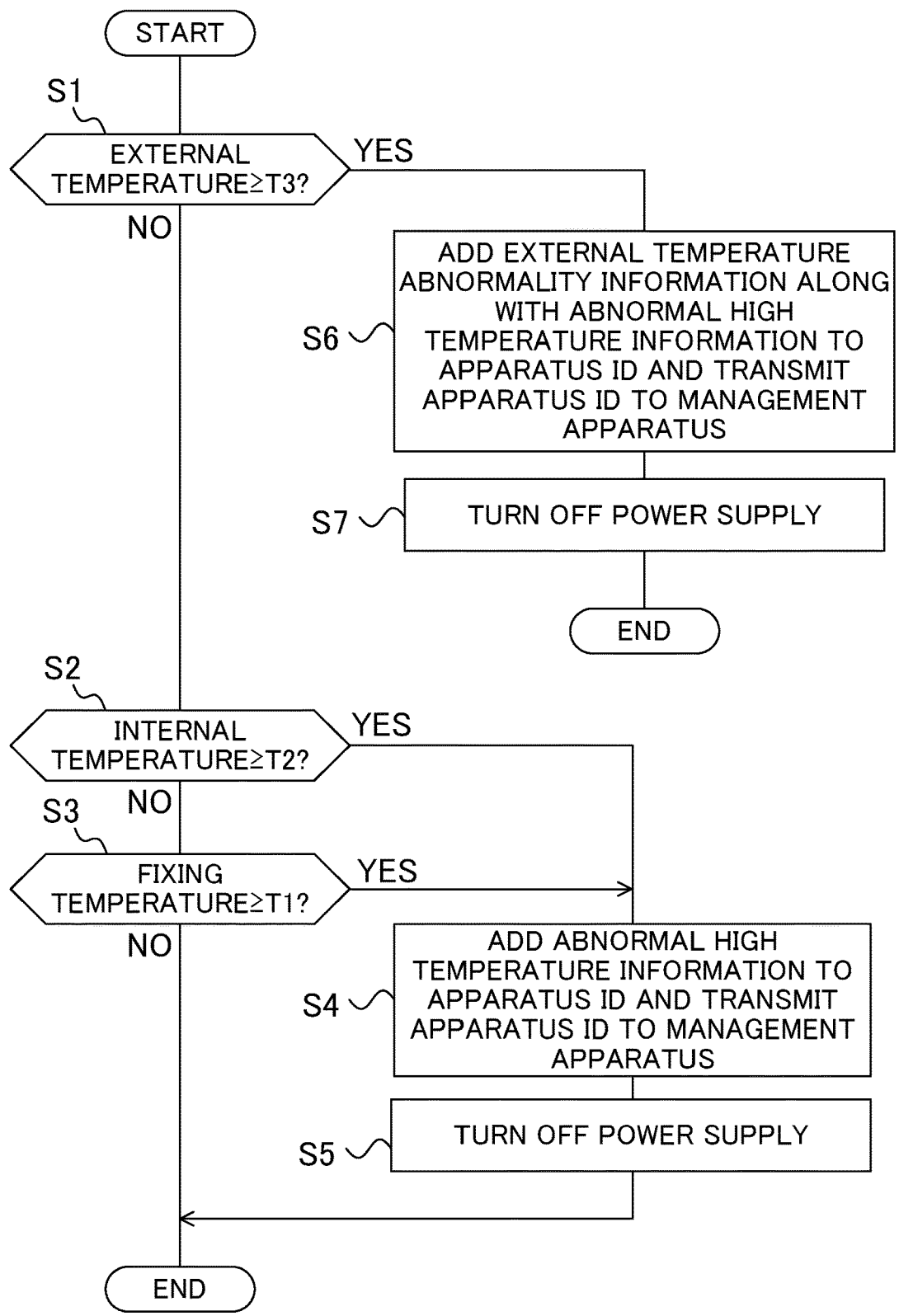
FIG. 9 is a flowchart illustrating an example of a process flow which is performed by a control device of an image forming apparatus.

An example of a process flow which is performed by the control device 10 of an image forming apparatus 6 will be described below with reference to the flowchart illustrated in FIG. 9. First, the abnormal high temperature detector 102 determines whether the temperature detected by the external temperature sensor 32 is equal to or higher than the threshold value T3 (S1).

When it is determined that the temperature detected by the external temperature sensor 32 is not equal to or higher than the threshold value T3 (NO in S1), the abnormal high temperature detector 102 determines whether the temperature detected by the internal temperature sensor 31 is equal to or higher than the threshold value T2 (S2).

When it is determined that the temperature detected by the internal temperature sensor 31 is not equal to or higher than the threshold value T2 (NO in S2), the abnormal high temperature detector 102 determines whether the temperature detected by the fixing temperature sensor 131 is equal to or higher than the threshold value T1 (S3).

When the abnormal high temperature detector 102 determines that the temperature detected by the fixing temperature sensor 131 is equal to or higher than the threshold value T1 (NO in S3), it means that an abnormal high temperature does not occur in the image forming apparatus 6, and thus the process flow ends.

When the abnormal high temperature detector 102 determines that the temperature detected by the internal temperature sensor 31 is equal to or higher than the threshold value T2 (YES in S2) or when the abnormal high temperature detector 102 determines that the temperature detected by the fixing temperature sensor 131 is equal to or higher than the threshold value T1 (YES in S3), it means that an abnormal high temperature has occurred in the image forming apparatus 6, and thus the controller 100 adds abnormal high temperature information indicating that an abnormal high temperature has occurred in the image forming apparatus 6 to the apparatus ID specific to the image forming apparatus 6 and transmits the apparatus ID from the network interface device 91 to the management apparatus 2 (S4), then controls the power supply device 33 such that the power supply of the image forming apparatus 6 is turned off (S5), and then ends the process flow.

When the abnormal high temperature detector 102 determines that the temperature detected by the external temperature sensor 32 is equal to or higher than the threshold value T3 in S1 (YES in S1), the controller 100 adds external temperature abnormality information along with abnormal high temperature information indicating that an abnormality high temperature has occurred in the image forming apparatus 6 to the apparatus ID specific to the image forming apparatus 6, transmits the apparatus ID from the network interface device 91 to the management apparatus 2 (S6), and then controls the power supply device 33 such that the power supply of the image forming apparatus 6 is turned off (S7). Thereafter, the process flow ends.

Figure 10:
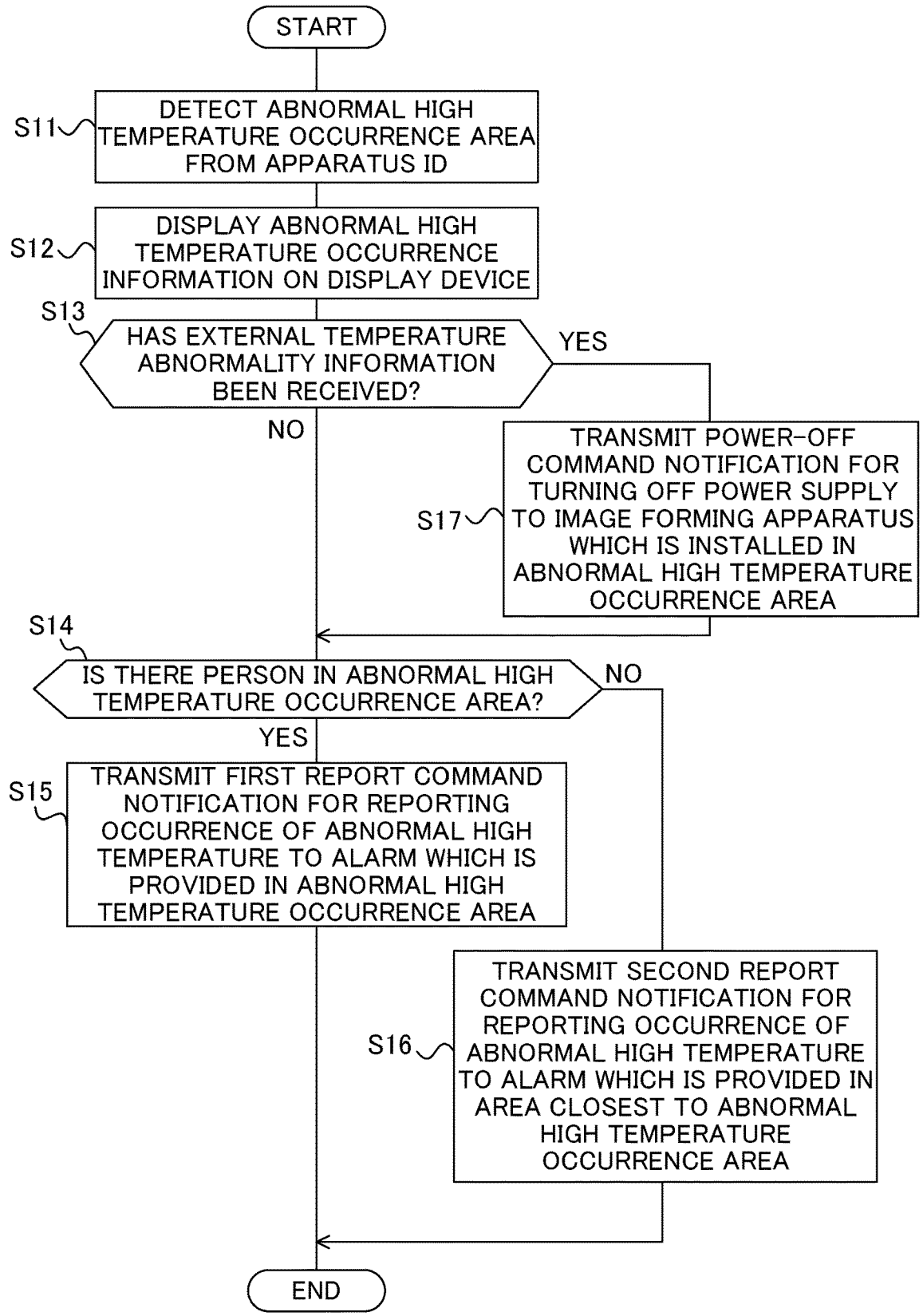
FIG. 10 is a flowchart illustrating an example of a process flow which is performed by a control device of a management apparatus.

An example of a process flow which is performed by the control device 25 of the management apparatus 2 will be described below with reference to the flowchart illustrated in FIG. 10. This process flow is a process flow which is performed when the communication device 24 receives abnormal high temperature information which is transmitted from an image forming apparatus 6.

When the communication device 24 receives abnormal high temperature information which is transmitted from an image forming apparatus 6, the area detector 254 detects an abnormal high temperature occurrence area by identifying an area in which the image forming apparatus 6 in which an abnormal high temperature has been detected is provided on the basis of the apparatus ID specific to the image forming apparatus 6 which is transmitted along with the abnormal high temperature information and the installation area information stored in the installation area information storage device 233 (FIG. 7A) (S11). Subsequently, the controller 251 displays occurrence information of the abnormal high temperature (for example, information indicating that the abnormal high temperature has occurred in the image forming apparatus 6 or the area in which the abnormal high temperature has occurred) on the display device 22 (S12). In S12, the controller 251 may additionally cause the communication device 24 to transmit occurrence information of the abnormal high temperature to the alarm A5 which is provided in the area E5 in which the management apparatus 2 is provided.

Subsequently, the controller 251 determines whether the communication device 24 has received external temperature abnormality information along with the abnormal high temperature information (S13).

When it is determined that the communication device 24 has not received external temperature abnormality information (NO in S13), the controller 251 determines whether there is a person in the abnormal high temperature occurrence area on the basis of the stay area information stored in the stay area information storage device 232 (S14).

When it is determined that there is a person in the abnormal high temperature occurrence area (YES in S14), the controller 251 transmits a first report command notification for reporting that the abnormal high temperature has occurred in the area in which the alarm A is provided from the communication device 24 to the alarm A which is provided in the abnormal high temperature occurrence area (S15). Thereafter, the process flow ends.

On the other hand, when it is determined that there is no person in the abnormal high temperature occurrence area (NO in S14), the controller 251 transmits a second report command notification for reporting that the abnormal high temperature has occurred in an area near the area in which the alarm A is provided from the communication device 24 to the alarm A which is provided in the area near the abnormal high temperature occurrence area (S16) and ends the process flow. When it is determined that there is no person in the abnormal high temperature occurrence area (NO in S14), the controller 251 may additionally determine whether there is a person in the area near the abnormal high temperature occurrence area on the basis of the stay area information stored in the stay area information storage device 232 and cause the communication device 24 to transmit the second report command notification to only the alarm A which is provided in the nearby area in which it is determined that there is a person on the condition that it is determined that there is a person.

When the controller 251 determines that the communication device 24 has received external temperature abnormality information in S13 (YES in S13), the external temperature is an abnormal high temperature and thus the controller 251 transmits a power-off command notification for turning off the power supply of the image forming apparatus 6 which is installed in the abnormal high temperature occurrence area to the image forming apparatus 6 via the communication device 24 (S17). Thereafter, the process flow progresses to S14.

According to this embodiment, when an abnormal high temperature in an image forming apparatus 6 is detected, abnormal high temperature information is transmitted to the management apparatus 2 and thus a manager of the building (for example, a doorkeeper) can rapidly ascertain that the abnormal high temperature has occurred.

Since a person in an area in which the image forming apparatus 6 in which an abnormal high temperature has been detected is provided (that is, an abnormal high temperature occurrence area) is notified of occurrence of the abnormal high temperature by the alarm A, it is possible to rapidly ascertain an abnormal state.

When there is no person in an abnormal high temperature occurrence area, a person in a nearby area is notified of occurrence of the abnormal high temperature. Since a manager of the building 11 is also notified of occurrence of the abnormal high temperature, it is possible to rapidly cope with an abnormal state.

Since a temperature sensor which is installed for a purpose other than detection of an abnormal high temperature (for example, the fixing temperature sensor 131, the internal temperature sensor 31, or the external temperature sensor 32) is used to detect an abnormal high temperature, it is not necessary to newly employ a complicated mechanism. Accordingly, it is possible to appropriately prevent a secondary accident when an abnormal high temperature has occurred in an image forming apparatus 6 with a relatively simple configuration.

The present disclosure is not limited to the configurations of the above-mentioned embodiments and can be modified in various forms. In the above-mentioned embodiments, the configurations and processes described above with reference to FIGS. 1 to 10 are only examples of the present disclosure and do not intend to limit the present disclosure to the configurations and processes.

While the present disclosure has been described in detail with reference to the embodiments thereof, it would be apparent to those skilled in the art the various changes and modifications may be made therein within the scope defined by the appended claims.

What is claimed is:
1. A control system comprising:
image forming apparatuses at least one of which is installed in each of a plurality of areas in a building;
a management apparatus that manages security of the building; and
alarms that are each provided for each of the areas, respectively,
wherein each of the image forming apparatuses includes:
a temperature sensor;
a first communication device that communicates with an external device;
a first processor; and
a first storage device that stores a first control program,
the first processor, by executing the first control program, functioning as,
an abnormal high temperature detector that detects whether a temperature detected by the temperature sensor is equal to or higher than a threshold value which is predetermined as an abnormal high temperature, and
a first controller that causes the first communication device to transmit abnormal high temperature information indicating that an abnormal high temperature has occurred in the image forming apparatus to the management apparatus when the abnormal high temperature detector detects that the temperature is equal to or higher than the threshold value,
wherein the management apparatus includes:
a second storage device that includes an installation area information storage device storing installation area information indicating the areas in which the image forming apparatuses are installed;
a second communication device that communicates with an external device; and
a second processor,
the second processor, by executing a second control program which is stored in the second storage device, functioning as,
an area detector that detects an area in which the image forming apparatus having transmitted the abnormal high temperature information is installed as an abnormal high temperature occurrence area on the basis of the installation area information when the second communication device receives the abnormal high temperature information, and
a second controller that causes the second communication device to transmit a report command notification for reporting that an abnormal high temperature has occurred in the area in which the alarm is provided to the alarm which is provided in the abnormal high temperature occurrence area detected by the area detector,
wherein each of the image forming apparatuses comprises a plurality of the temperature sensors,
wherein one of the plurality of temperature sensors detects an external temperature of the image forming apparatus, wherein the first controller causes the first communication device to transmit external temperature abnormality information indicating that an abnormal temperature has occurred outside the image forming apparatus to the management apparatus when the abnormal high temperature detector detects that the temperature is equal to or higher than the threshold value, and wherein the second controller of the management apparatus causes the first communication device to transmit a power-off command notification for turning off a power supply of the image forming apparatus to the image forming apparatus which is installed in the abnormal high temperature occurrence area detected by the area detector when the second communication device receives the external temperature abnormality information, wherein each of the image forming apparatuses comprises a fixing device that includes a heating roller and fixes a toner image onto a recording sheet using the heating roller, wherein the plurality of temperature sensors include an external temperature sensor that detects an external temperature of the image forming apparatus, an internal temperature sensor that detects an internal temperature of the image forming apparatus, and a fixing temperature sensor that detects a surface temperature of the heating roller of the fixing device, and wherein the first controller causes the first communication device to transmit the external temperature abnormality information to the management apparatus when the external temperature detected by the external temperature sensor is lower than a predetermined first threshold value and the internal temperature detected by the internal temperature sensor is equal to or higher than a predetermined second threshold value which is greater than the first threshold value.

2. The control system according to claim 1, wherein the first controller of each of the image forming apparatuses turns off a power supply of the image forming apparatus when the abnormal high temperature detector detects that the temperature is equal to or higher than the threshold value.

3. The control system according to claim 1, wherein each of the image forming apparatuses comprises a fixing device that includes a heating roller and fixes a toner image onto a recording sheet using the heating roller, wherein the plurality of temperature sensors include an external temperature sensor that detects an external temperature of the image forming apparatus, an internal temperature sensor that detects an internal temperature of the image forming apparatus, and a fixing temperature sensor that detects a surface temperature of the heating roller of the fixing device, and wherein the first controller causes the first communication device to transmit the external temperature abnormality information to the management apparatus when the abnormal high temperature detector detects that the external temperature detected by the external temperature sensor is equal to or higher than a predetermined first threshold value.

4. A control system comprising:

image forming apparatuses at least one of which is installed in each of a plurality of areas in a building;

a management apparatus that manages security of the building; and alarms that are each provided for each of the areas, respectively, wherein each of the image forming apparatuses includes:
   a temperature sensor;
   a first communication device that communicates with an external device;
   a first processor; and
   a first storage device that stores a first control program, the first processor, by executing the first control program, functioning as,
   an abnormal high temperature detector that detects whether a temperature detected by the temperature sensor is equal to or higher than a threshold value which is predetermined as an abnormal high temperature, and
   a first controller that causes the first communication device to transmit abnormal high temperature information indicating that an abnormal high temperature has occurred in the image forming apparatus to the management apparatus when the abnormal high temperature detector detects that the temperature is equal to or higher than the threshold value, wherein the management apparatus includes:
   a second storage device that includes an installation area information storage device storing installation area information indicating the areas in which the image forming apparatuses are installed;
   a second communication device that communicates with an external device; and
   a second processor, the second processor, by executing a second control program which is stored in the second storage device, functioning as,
   an area detector that detects an area in which the image forming apparatus having transmitted the abnormal high temperature information is installed as an abnormal high temperature occurrence area on the basis of the installation area information when the second communication device receives the abnormal high temperature information, and
   a second controller that causes the second communication device to transmit a report command notification for reporting that an abnormal high temperature has occurred in the area in which the alarm is provided to the alarm which is provided in the abnormal high temperature occurrence area detected by the area detector, wherein each of the image forming apparatuses comprises a plurality of the temperature sensors, wherein one of the plurality of temperature sensors detects an external temperature of the image forming apparatus, wherein the first controller causes the first communication device to transmit external temperature abnormality information indicating that an abnormal temperature has occurred outside the image forming apparatus to the management apparatus when the abnormal high temperature detector detects that the temperature is equal to or higher than the threshold value, and wherein the second controller of the management apparatus causes the first communication device to transmit a power-off command notification for turning off a power supply of the image forming apparatus to the image forming apparatus which is installed in the abnormal high temperature occurrence area detected by the area detector when the second communication device receives the external temperature abnormality information, wherein each of the image forming apparatuses comprises a fixing device that includes a heating roller and fixes a toner image onto a recording sheet using the heating roller, wherein the plurality of temperature sensors include an external temperature sensor that detects an external temperature of the image forming apparatus, an internal temperature sensor that detects an internal temperature of the image forming apparatus, and a fixing temperature sensor that detects a surface temperature of the heating roller of the fixing device, and wherein the first controller causes the first communication device to transmit the external temperature abnormality information to the management apparatus when the external temperature detected by the external temperature sensor is lower than a predetermined first threshold value, the internal temperature detected by the internal temperature sensor is lower than a predetermined second threshold value, and the surface temperature of the heating roller detected by the fixing temperature sensor is equal to or higher than a predetermined third threshold value which is greater than the second threshold value.

5. A management apparatus that is connected to image forming apparatuses which are installed in a plurality of areas in a building and alarms which are provided for each of the areas, and manages security of the building, the management apparatus comprising:

a storage device that includes an installation area information storage device storing installation area information indicating the areas in which the image forming apparatuses are installed;

a communication device that communicates with an external device; and a processor, the processor, by executing a control program which is stored in the storage device, functioning as, an area detector that detects an area in which the image forming apparatus from which an abnormal high temperature is detected is installed as an abnormal high temperature occurrence area on the basis of abnormal high temperature information which is transmitted from the image forming apparatus and which indicates that an abnormal high temperature has occurred in the image forming apparatus and the installation area information, and a controller that causes the communication device to transmit a first report command notification for reporting that an abnormal high temperature has occurred in the area in which an alarm which is provided in the abnormal high temperature occurrence area detected by the area detector is provided to the alarm, the management apparatus further comprising a display device, wherein the controller displays occurrence information of the abnormal high temperature on the display device.

6. The management apparatus according to claim 5, wherein the storage device further includes an alarm installation area information storage device that stores alarm installation area information indicating the areas in which the alarms are installed, and the controller performs:

determining whether there is a person in the abnormal high temperature occurrence area detected by the area detector on the basis of detection information which is acquired from an entry and exit detecting device that detects entry and exit of a person for each area; and causing the communication device to transmit a second report command notification for reporting that an abnormal high temperature has occurred in an area near the area in which the alarm is provided to the alarm which is provided in the area near the abnormal high temperature occurrence area when it is determined that there is no person in the abnormal high temperature occurrence area.

7. The management apparatus according to claim 6, wherein the controller performs:

further determining whether there is a person in an area near the abnormal high temperature occurrence area on the basis of the detection information when it is determined that there is no person in the abnormal high temperature occurrence area; and causing the communication device to transmit a second report command notification for reporting that an abnormal high temperature has occurred in the area near the area in which the alarm is provided to only the alarm which is provided in the nearby area in which it is determined that there is a person.

8. An image forming apparatus that is connected to a management apparatus managing security of a building and is provided in the building, the image forming apparatus comprising:

a temperature sensor;

a communication device that communicates with an external device;

a storage device that stores a control program; and a processor, the processor, by executing the control program, functioning as, an abnormal high temperature detector that detects whether a temperature detected by the temperature sensor is equal to or higher than a threshold value which is predetermined as an abnormal high temperature, and a controller that causes the communication device to transmit abnormal high temperature information indicating that an abnormal high temperature has occurred in the image forming apparatus to the management apparatus when the abnormal high temperature detector detects that the temperature is equal to or higher than the threshold value, the image forming apparatus, further comprising a plurality of the temperature sensors, wherein one of the plurality of temperature sensors detects an external temperature of the image forming apparatus, and wherein the controller causes the communication device to transmit external temperature abnormality information indicating that an abnormal temperature has occurred outside the image forming apparatus to the management apparatus when the abnormal high temperature detector detects that the temperature is equal to or higher than the threshold value, the image forming apparatus further comprising a fixing device that includes a heating roller and fixes a toner image onto a recording sheet using the heating roller, wherein the plurality of temperature sensors include an external temperature sensor that detects an external temperature of the image forming apparatus, an internal temperature sensor that detects an internal temperature of the image forming apparatus, and a fixing temperature sensor that detects a surface temperature of the heating roller of the fixing device, and wherein the controller causes the communication device to transmit the external temperature abnormality information to the management apparatus when the external temperature detected by the external temperature sensor is lower than a predetermined first threshold value and the internal temperature detected by the internal temperature sensor is equal to or higher than a predetermined second threshold value which is greater than the first threshold value.

9. The image forming apparatus according to claim 8, further comprising a fixing device that includes a heating roller and fixes a toner image onto a recording sheet using the heating roller, wherein the plurality of temperature sensors include an external temperature sensor that detects an external temperature of the image forming apparatus, an internal temperature sensor that detects an internal temperature of the image forming apparatus, and a fixing temperature sensor that detects a surface temperature of the heating roller of the fixing device, and wherein the controller causes the communication device to transmit the external temperature abnormality information to the management apparatus when the external temperature detected by the external temperature sensor is lower than a predetermined first threshold value, the internal temperature detected by the internal temperature sensor is lower than a predetermined second threshold value, and the surface temperature detected by the fixing temperature sensor is equal to or higher than a predetermined third threshold value which is greater than the second threshold value.

\* \* \* \* \*